US 8,247,476 B2

(12) United States Patent
Hajek et al.

(10) Patent No.: US 8,247,476 B2
(45) Date of Patent: Aug. 21, 2012

(54) CURABLE CASTING COMPOUND FOR MANUFACTURING PLASTIC MOULDED PARTS

(75) Inventors: Andreas Hajek, Brackenheim (DE); Jürgen Wessel, Rosengarten (DE)

(73) Assignee: BLANCO GmbH + Co KG, Oberderdingen (DE)

( * ) Notice: Subject to any disclaimer, the term of this patent is extended or adjusted under 35 U.S.C. 154(b) by 0 days.

(21) Appl. No.: 12/932,626

(22) Filed: Mar. 2, 2011

(65) Prior Publication Data
US 2011/0213064 A1 Sep. 1, 2011

Related U.S. Application Data

(63) Continuation of application No. PCT/EP2009/059441, filed on Jul. 22, 2009.

(30) Foreign Application Priority Data

Sep. 5, 2008 (DE) .................. 10 2008 046 569

(51) Int. Cl.
C08J 9/32 (2006.01)
C08K 7/00 (2006.01)

(52) U.S. Cl. .................. 523/219; 523/218; 523/220

(58) Field of Classification Search .................. 524/322; 523/218, 220
See application file for complete search history.

(56) References Cited

U.S. PATENT DOCUMENTS

| 4,839,394 A * | 6/1989 | Champion | 521/55 |
| 5,218,013 A | 6/1993 | Schock | 523/209 |
| 5,710,204 A | 1/1998 | Harke et al. | 524/494 |
| 5,753,741 A | 5/1998 | Harke et al. | 524/494 |
| 6,664,314 B1 | 12/2003 | Hajek et al. | 523/218 |
| 2003/0075834 A1* | 4/2003 | Hajek et al. | 264/331.18 |
| 2005/0080184 A1 | 4/2005 | Hajek et al. | 524/492 |
| 2007/0014952 A1 | 1/2007 | Delong et al. | 428/35.7 |
| 2007/0197687 A1* | 8/2007 | Yamane et al. | 523/218 |

FOREIGN PATENT DOCUMENTS

| DE | 38 32 351 A1 | 4/1990 |
| DE | 696 01 393 T2 | 9/1999 |
| DE | 698 25 862 T2 | 10/2005 |
| EP | 0 653 475 A2 | 5/1995 |
| EP | 0 716 097 A1 | 6/1996 |
| EP | 1 207 180 A1 | 5/2002 |
| EP | 1 672 012 A1 | 6/2006 |
| GB | 2 359 084 A | 8/2001 |
| JP | 2001 335382 | 12/2001 |
| WO | WO 95/26368 A1 | 10/1995 |
| WO | WO 99/47594 A1 | 9/1999 |
| WO | WO 99/50324 | 10/1999 |
| WO | WO 00/28872 A2 | 5/2000 |
| WO | WO 01/27175 A1 | 4/2001 |
| WO | WO 03/080716 A | 10/2003 |
| WO | WO 2005/071000 A1 | 8/2005 |

* cited by examiner

Primary Examiner — David W Wu
Assistant Examiner — Vu A Nguyen

(57) ABSTRACT

In order to provide a curable casting compound by means of which plastic molded parts, having a structured surface and improved cleanability, can be produced, it is proposed that the casting compound comprises a binder material and a filler material, wherein the filler material is ca. 40 to ca. 85% by weight of the casting compound, and comprises two or more filler fractions, wherein a first filler fraction consists of solid granular mineral particles, and a second filler fraction consists of dimensionally stable hollow microspheres, and wherein the second filler fraction is ca. 1% by volume or more of the casting compound.

14 Claims, No Drawings

CURABLE CASTING COMPOUND FOR MANUFACTURING PLASTIC MOULDED PARTS

This application is a continuation of International application No. PCT/EP2009/059441 filed on Jul. 22, 2009, which claims priority of German patent application No. 10 2008 046 569.0 filed Sep. 5, 2008.

The invention relates to a curable casting compound for manufacturing plastic moulded parts, comprising a binder material and a filler material, wherein the filler material content of the casting compound is ca. 40 to ca. 85% by weight and comprises solid granular mineral particles.

Curable casting compounds are widely used to manufacture plastic moulded parts for the sanitary- or kitchen sector, such as for example sinks, worktops, bath tubs, washbasins etc.

The casting compounds that are used in this case conventionally contain a binder material and, for improving the mechanical properties of the plastic moulded parts, a filler material.

Plastic moulded parts having textured visible surfaces are widespread. Texturing enhances the attractive appearance of the visible surfaces and has the result that damage, such as for example scratches, is less apparent on them than on smooth surfaces. Particularly popular are plastic moulded parts having textured granite decorative surfaces, which in appearance bear as close a resemblance to natural granite as possible.

In DE 38 32 351 A1 it is proposed, for the manufacture of plastic moulded parts having a textured visible surface, to use a casting compound that comprises coarse mineral filler particles having a size of ca. 0.1 mm to ca. 0.2 mm.

In WO 00/28872 a curable casting compound is described, with which fittings components having a textured granite decorative surface may be manufactured.

From the point of view of cleanability, however, the textured visible surfaces of the plastic moulded parts obtained using conventional casting compounds are not fully equivalent to completely smooth surfaces.

The object of the invention is to propose a curable casting compound that may be used to manufacture plastic moulded parts that have a textured surface with an improved cleanability.

In a curable casting compound of the type described in the introduction this object is achieved according to the invention in that the filler material comprises two or more filler fractions, wherein a first filler fraction consists of solid granular mineral particles and a second filler fraction consists of dimensionally stable hollow microbeads, and wherein the content of the second filler fraction in the casting compound is ca. 1% by volume or more.

By virtue of the casting compound containing the first filler fraction of solid granular mineral particles, it is ensured that with the casting compound plastic moulded parts having a textured surface, for example a granite decorative surface, may be obtained.

Surprisingly, it has been determined that by adding a second filler fraction of dimensionally stable hollow microbeads to the casting compound a marked improvement of the cleanability of the visible surface is achieved. In particular, the stains caused by proteins, starch, grease etc., that commonly occur in the kitchen area are easier to remove. Nevertheless, the texture of the visible surface is retained.

The appearance of the visible surface therefore as a rule remains substantially unaltered by the addition of the hollow microbeads, so that the attractive appearance associated with the texture, for example the resemblance of a granite decorative surface to natural granite, is retained.

The use of solid microbeads in curable casting compounds is already known from EP 1 672 012 A1. There, it is proposed that to a casting compound comprising binder components and a first filler component glass microbeads having a particle size that is smaller than that of the first filler component be added as a second filler component in order to obtain an optimized packing density of the filler mixture so that the binder component content of the casting compound may be minimized.

With regard to an improvement of the cleanability of the visible surfaces of plastic moulded parts, however, markedly poorer results are achieved by the use of solid microbeads than by the use according to the invention of hollow microbeads.

From WO 99/47594 the use of deformable hollow microbeads filled with blowing agent in curable casting compounds is known. By virtue of an expansion of the deformable hollow microbeads a shrinkage at the rear surface, i.e. the surface remote from the visible surface, that arises during setting of the binder of the casting compound may be compensated.

An influencing of the properties of the visible surface of a plastic moulded part is however scarcely achievable with these deformable hollow microbeads because they accumulate in upper regions within a casting compound introduced into a casting mould. In a casting mould used to manufacture a plastic moulded part as a rule the portions, in which a visible surface of the moulded part is to be formed, lie at the bottom and the portions, in which a rear surface is to be formed, lie at the top. It is thereby ensured that the portions provided for producing the visible surface even in the event of possible shrinking of the binder during curing always remain filled with casting compound, so that a defect-free visible surface is obtained. The accumulation of the deformable hollow microbeads in upper regions of the casting mould therefore results in their being present at the visible surface in such a low concentration that they are unable to influence the properties of the visible surface.

According to the invention a markedly improved cleanability of the visible surface of a plastic moulded part is achieved even with a content of the second filler fraction consisting of hollow microbeads in the casting compound of only ca. 1% by volume.

Significant improvements of the cleanability are to be determined in particular if the content of the second filler fraction in the casting compound is 5% by volume or more.

In order to ensure a good processability of the casting compound, the content of the second filler fraction in the casting compound is further preferred to be 30% by volume or less.

It is particularly advantageous if the mean diameter of the hollow microbeads is ca. 5 to ca. 30% of the mean particle size of the particles of the first filler fraction.

In the first filler fraction preferably granular particles having a mean particle size of ca. 50 μm to ca. 1000 μm are used because these are particularly highly suitable for achieving an attractive-looking texture of the visible surfaces of a plastic moulded part, such as for example a granite decorative appearance.

The dimensionally stable hollow microbeads in a preferred manner have a mean diameter of ca. 5 to ca. 300 μm, in a further preferred manner of ca. 25 to ca. 150 μm, in a particularly preferred manner of ca. 50 to ca. 100 μm.

Typically, by hollow microbeads in the sense of the present invention are meant microbeads having an enclosed hollow space volume of ca. 20% by volume of the bead volume or more. The hollow microbeads in this case may have various structures. For example, they may have in each case a coherent hollow space surrounded by a wall. They may however alternatively be made of a porous material that comprises a plurality of hollow spaces.

It is advantageous if the specific density of the hollow microbeads is from ca. 0.5 to ca. 1 g/cm³. Hollow microbeads of such a density remain substantially uniformly distributed in the casting compound, the binder material of which conventionally has a density of ca. 0.9 to ca. 1.2 g/cm³, after the casting compound has been transferred into a casting mould for manufacture of a moulded part.

A specific density of the dimensionally stable hollow microbeads in this range is high enough to prevent the hollow microbeads from rising into upper-lying regions of the casting compound, i.e. towards the rear surface of the moulded part. A sufficient concentration at a bottom-lying visible surface is therefore ensured.

On the other hand, a specific density of the dimensionally stable hollow microbeads that lies within this range is not high enough to lead to sinking of the hollow microbeads into regions of the casting compound that are disposed at the bottom of the casting mould. When manufacturing plastic moulded parts that have a plurality of visible surfaces facing in different directions, it is therefore guaranteed that not only at a visible surface facing downwards inside the casting mould but also at visible surfaces facing in other directions a substantially comparable concentration of hollow microbeads is achieved, with the result that for each of these surfaces an improved cleanability is obtained.

Hollow microbeads that are manufactured from a silicate material have proved particularly suitable for improving the cleanability of a plastic moulded part.

In particular, it has been discovered that for the dimensionally stable hollow microbeads that are used in accordance with the invention a silanization process, such as is frequently carried out on filler materials to enable a stable bond of the filler materials with a binding agent, is surprisingly not necessary.

The choice of the binder material is not subject to any particular restrictions. For example, the binder material may comprise a liquid acrylic monomer component, which during the manufacture of a plastic moulded part may polymerize while curing into a polyacrylate. To increase the viscosity of the casting compound, a fraction of a prepolymerized acrylic component may be added to the acrylic monomer component, for example prepolymerized polymethyl methacrylate (PMMA) may be added to the monomer methyl methacrylate (MMA).

The selection of the material of the particles of the first filler fraction is generally non-critical. For example, silicate filler materials, such as glass, quartz, cristobalite or tridymite, or aluminium-hydroxide-based filler materials such as aluminium trihydroxide (ATH) may be used.

As binder materials and as materials of the particles of the first filler fraction it is possible in particular also to use the materials recommended in WO 95/26368, EP 0 716 097 A1, WO 01/27175 A1, WO 03/080716 A1, EP 1 207 180 A1 and WO 2005/071000 A1 in each case as binders and/or fillers for curable casting compounds.

The joint content of the first and the second filler fraction in the total filler material is often ca. 80% by weight or more, in particular even ca. 90% by weight or more. The filler material may even consist substantially entirely of the first and the second filler fraction.

If in addition to the first and the second filler fraction further filler fractions are provided, these may contain various filler materials, by means of which special effects are achievable, for example fillers materials in the form of fibres, whiskers or needles.

The invention further relates to a use of the casting compound according to the invention to manufacture plastic moulded parts for the kitchen- or sanitary sector.

The casting compound according to the invention is particularly suitable for manufacturing sinks and worktops for kitchens because on these components stains occur particularly often and their cleanability is therefore of great importance.

Finally, the invention relates also to plastic moulded parts that are manufactured using the casting compound according to the invention.

These and further advantages of the present invention are described in greater detail below with reference to the examples.

It has been found that, given the use according to the invention of dimensionally stable hollow microbeads, the improvement of the cleanability of the visible surface correlates with a reduction of the roughness profile $R_t$ from peak to trough of the visible surface. For this reason, in the following the roughness profile $R_t$ is indicated as a measure of the cleanability.

REFERENCE EXAMPLE 1

A casting compound is manufactured by adding a binder material to a filler material.

The binder material is obtained by dissolving 2.0 kg of polymethyl methacrylate (PMMA) in the molecular weight range $M_w$ of 50,000 to 250,000 in 8.0 kg of methyl methacrylate (MMA) to increase the viscosity and then adding 35 g of stearic acid as a release agent and 200 g of trimethylolpropane trimethacrylate (TRIM) as a curing agent.

The filler material consists of various types of the granular quartz material Granucol® (from the company Gebrüder Dorfner GmbH & Co., Hirschau) as well as wollastonite (from the company Quarzwerke GmbH, Frechen). The following types of Granucol® and wollastonite were used:
Granucol® brown 10/8 (mean particle size=570 µm)
Granucol® earth brown 4/8 (mean particle size=570 µm)
Granucol® white 1/8 (mean particle size=570 µm)
Granucol® white 2/9 (mean particle size=330 µm)
Wollastonite (mean needle length=1 to 25 µm)

Through use of the various types of Granucol®, which are in particular differently coloured, an attractive granite decorative appearance may be achieved. The addition of wollastonite improves the mechanical properties of the moulded parts that may be manufactured with the casting compound and in particular reduces the occurrence on the moulded parts of so-called bubbles, such as may arise as a result of localized overheating during the curing process. The advantages of the use of wollastonite are described in detail in EP 1 207 180 A1.

The filler material is added to, and mixed homogeneously with, the binder material.

The composition of the casting compound according to Reference Example 1 is reproduced in Table 1, the contents of the individual components being indicated in % by weight.

TABLE 1

|  | Reference Example 1 |
| --- | --- |
| Binder material | 27.6 |
| Wollastonite | 5.6 |

TABLE 1-continued

|  | Reference Example 1 |
|---|---|
| Granucol ® brown 10/8 | 1.3 |
| Granucol ® earth brown 4/8 | 6.4 |
| Granucol ® white 1/8 | 43.2 |
| Granucol ® white 2/9 | 15.9 |

After the addition of 80 g of lauroyl peroxide and 40 g di-(4-tert-butylcyclohexyl)peroxydicarbonate the casting compound is introduced into a casting mould for a kitchen sink and polymerized while curing. The visible surface of a test piece removed from the obtained kitchen sink is examined to determine its roughness profile from peak to trough $R_t$. The examination is conducted using a Hommel measuring instrument T 2000 (from the company Hommel-Werke, Schwenningen) in accordance with the manufacturer's instructions for operating the equipment.

The result of the examination is indicated in Table 2.

TABLE 2

|  | Roughness profile $R_t$ from peak to trough [μm] |
|---|---|
| Reference Example 1 | 82 |

EXAMPLES 1 TO 10

Casting compounds according to the invention are manufactured, which in their composition correspond for the most part to the casting compound according to Reference Example 1, wherein in each case different quantities of ceramic dimensionally stable hollow microbeads ("E-SPHERES®", obtainable from the company C. A. Erbslöh, Krefeld) of various particle sizes are added in exchange for corresponding quantities of binder material and/or Granucol®. The wollastonite content is kept identical in all of the examples. In the casting compounds obtained, the Granucol® types and wollastonite form a first filler fraction and the hollow microbeads form a second filler fraction. The following types of dimensionally stable hollow microbeads are used:

E-SPHERES® SLG (mean diameter d50=ca. 94 μm, specific density=0.6 to 0.8 g/cm³)
E-SPHERES® SL 150 (mean diameter d50=ca. 68 μm, specific density=0.6 to 0.8 g/cm³)
E-SPHERES® SL 75 (mean diameter d50=ca. 27 μm, specific density=0.6 to 0.8 g/cm³)

The hollow microbeads have in each case an expanded, porous structure. Their enclosed hollow space volume is ca. 67% by volume of the bead volume.

The compositions of the casting compounds of Examples 1 to 10 are indicated in Table 3, the contents of the individual components being indicated in % by weight.

TABLE 3

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Binder material | 25.1 | 25.1 | 25.1 | 25.1 | 25.1 | 25.1 | 25.1 | 25.1 | 25.1 | 25.1 |
| Wollastonite | 5.6 | 5.6 | 5.6 | 5.6 | 5.6 | 5.6 | 5.6 | 5.6 | 5.6 | 5.6 |
| Granucol ® brown 10/8 | 1.3 | 1.3 | 1.3 | 1.3 | 1.3 | 1.3 | 1.3 | 1.3 | 1.3 | 1.3 |
| Granucol ® earth brown 4/8 | 6.4 | 6.4 | 6.4 | 6.4 | 6.4 | 6.4 | 6.4 | 6.4 | 6.4 | 6.4 |
| Granucol ® white 1/8 | 43.2 | 43.2 | 43.2 | 43.2 | 43.2 | 43.2 | 43.2 | 43.2 | 43.2 | 43.2 |
| Granucol ® white 2/9 | 17.6 | 16.8 | 15.9 | 13.5 | 8.4 | 3.4 | 15.9 | 8.4 | 15.9 | 8.4 |
| E-SPHERES ® SLG | 0.8 | 1.6 | 2.5 | 4.9 | 10.0 | 15.0 | — | — | — | — |
| E-SPHERES ® SL 150 | — | — | — | — | — | — | 2.5 | 10.0 | — | — |
| E-SPHERES ® SL 75 | — | — | — | — | — | — | — | — | 2.5 | 10.0 |

For selected examples, Table 4 shows the contents in % by volume, to which the contents of the hollow microbeads in % by weight that are indicated in Table 3 correspond.

TABLE 4

|  | Example 1 | Example 4 | Example 5 | Example 6 |
|---|---|---|---|---|
| E-SPHERES ® SLG content [% by wt.] | 0.8 | 4.9 | 10.0 | 15.0 |
| E-SPHERES ® SLG content [% by vol.] | 1.0 | 6.1 | 12.5 | 18.8 |

In the manner described for the casting compound according to Reference Example 1, each of the manufactured casting compounds is used to manufacture a kitchen sink and then a test piece of the kitchen sink is examined to determine the roughness profile $R_t$ of its visible surface. The results are indicated in Table 5.

TABLE 5

|  | Roughness profile $R_t$ from peak to trough [μm] |
|---|---|
| Example 1 | 69 |
| Example 2 | 64 |
| Example 3 | 59 |
| Example 4 | 46 |
| Example 5 | 37 |
| Example 6 | 33 |
| Example 7 | 58 |
| Example 8 | 31 |
| Example 9 | 46 |
| Example 10 | 23 |

The results demonstrate that the addition of dimensionally stable hollow microbeads of each of the types used leads to a clear reduction of the roughness profile $R_t$. Whereas for example with the composition according to Reference Example 1a roughness profile $R_t$ of 82 μm is obtained, the roughness profile $R_t$ in the case of use of the composition according to Example 10 containing 10.0% by weight of E-SPHERES® SL 75 is only 23 μm.

With an increasing content of hollow microbeads in the casting compound, the cleanability of the visible surface improves. Marked improvements are however already achieved at concentrations of the dimensionally stable hollow microbeads in the casting compound that are as low as 0.8% by weight (1.0% by volume, Example 1).

Compared to the casting compound obtained in the Reference Example, none of the kitchen sinks obtained using the casting compounds according to the invention present any impairment whatsoever of their granite decorative appearance.

REFERENCE EXAMPLE 2

A casting compound is manufactured, which in its composition for the most part corresponds to the casting compound according to Reference Example 1, wherein 15.0% by weight of solid glass microbeads ("BALLOTINI® B 70 B", of the company Eisenwerk Würth, Bad Friedrichshall, mean diameter d50=ca. 92 μm, specific density=2.45 g/cm³) are added in exchange for 2.5% by weight of binder material and 12.5% by weight Granucol® white 2/9.

The composition of the casting compound of Reference Example 2 is indicated in Table 6, the contents of the individual components being indicated in % by weight. The volume content of the solid hollow microbeads is 6.1% by volume.

TABLE 6

|  | Ref. Ex. 2 |
|---|---|
| Binder material | 25.1 |
| Wollastonite | 5.6 |
| Granucol ® brown 10/8 | 1.3 |
| Granucol ® earth brown 4/8 | 6.4 |
| Granucol ® white 1/8 | 43.2 |
| Granucol ® white 2/9 | 3.4 |
| BALLOTINI ® B 70 B | 15.0 |

A kitchen sink was manufactured from the casting compound, and then a test piece was examined to determine its surface properties, in the manner described for Reference Example 1. The result is indicated in Table 7.

TABLE 7

|  | Roughness profile $R_t$ from peak to trough [μm] |
|---|---|
| Reference Ex. 2 | 50 |

According to these results, by an addition of solid glass microbeads a lower reduction of the roughness profile at the visible surface of a plastic moulded part is achieved than by use of an identical content of dimensionally stable hollow microbeads. This is demonstrated by comparing the results obtained with the solid microbeads BALLOTINI® B 70 B to the results achieved using the hollow microbeads E-SPHERES® SLG of an almost identical mean diameter. Whereas with the casting compound according to Ex. 4 having an E-SPHERES® SLG content of 4.9% by weight (6.1% by volume) a roughness profile $R_t$ of 46 μm is obtained, the roughness profile $R_t$ in the case of use of the casting compound according to Reference Ex. 2, which has the same volume content of 6.1% by volume of solid microbeads, is 50 μm.

The effect of improving the cleanability of the visible surface therefore arises to a markedly greater extent given the use according to the invention of dimensionally stable hollow microbeads than given the use of solid microbeads.

The invention claimed is:

1. Curable casting compound for manufacturing plastic moulded parts, comprising a binder material and a filler material, wherein the filler material content of the casting compound is ca. 40 to ca. 85% by weight and comprises two or more filler fractions, wherein a first filler fraction consists of solid granular mineral particles and a second filler fraction consists of hollow microbeads, wherein the second filler fraction content of the casting compound is ca. 1% by volume or more, and wherein the mean diameter of the hollow microbeads is ca. 5 to ca. 30% of the mean particle size of the particles of the first filler fraction.

2. Casting compound according to claim 1, wherein the second filler fraction content of the casting compound is ca. 5% by volume or more.

3. Casting compound according to claim 1, wherein the second filler fraction content of the casting compound is ca. 30% by volume or less.

4. Casting compound according to claim 1, wherein the particles of the first filler fraction have a mean particle size of ca. 50 to ca. 1000 μm.

5. Casting compound according to claim 1, wherein the hollow microbeads have a mean diameter of ca. 300 μm or less.

6. Casting compound according to claim 1, wherein the hollow microbeads have a mean diameter of ca. 5 μm or more.

7. Casting compound according to claim 6, wherein the hollow microbeads have a mean diameter of ca. 25 to ca. 150 μm.

8. Casting compound according to claim 1, wherein the specific density of the hollow microbeads is from ca. 0.5 to ca. 1 g/cm³.

9. Casting compound according to claim 1, wherein the hollow microbeads have an enclosed hollow space volume of ca. 20% by volume of the bead volume or more.

10. Casting compound according to claim 1, wherein the hollow microbeads are manufactured from a silicate material.

11. Casting compound according to claim 1, wherein the binder material comprises a liquid acrylic monomer component.

12. Casting compound according to claim 1, wherein a material of the particles of the first filler fraction is selected from silicate filler materials and aluminium-hydroxide-based filler materials.

13. Plastic moulded parts, manufactured using the casting compound according to claim 1.

14. Casting compound according to claim 8, wherein the hollow microbeads have a mean diameter of ca. 50 to ca. 100 μm.

* * * * *

UNITED STATES PATENT AND TRADEMARK OFFICE
CERTIFICATE OF CORRECTION

| | |
|---|---|
| PATENT NO. | : 8,247,476 B2 |
| APPLICATION NO. | : 12/932626 |
| DATED | : August 21, 2012 |
| INVENTOR(S) | : Andreas Hajek et al. |

It is certified that error appears in the above-identified patent and that said Letters Patent is hereby corrected as shown below:

Column 8, Claim 14, line 59, replace --claim 8-- with --claim 7--.

Signed and Sealed this
Thirteenth Day of November, 2012

David J. Kappos
*Director of the United States Patent and Trademark Office*